US012702125B2

(12) United States Patent
Trocha et al.

(10) Patent No.: US 12,702,125 B2
(45) Date of Patent: Aug. 11, 2026

(54) FUMIGANT VAPORIZING AND DELIVERY APPARATUS

(71) Applicant: Draslovka Services Pty Ltd, Melbourne (AU)

(72) Inventors: Adam Trocha, Melbourne (AU); John Crocitti, Melbourne (AU); Kade McConville, Melbourne (AU)

(73) Assignee: Draslovka Services Pty Ltd, Melbourne (AU)

( * ) Notice: Subject to any disclaimer, the term of this patent is extended or adjusted under 35 U.S.C. 154(b) by 0 days.

(21) Appl. No.: 18/686,114

(22) PCT Filed: Aug. 25, 2022

(86) PCT No.: PCT/AU2022/051034
§ 371 (c)(1),
(2) Date: Feb. 23, 2024

(87) PCT Pub. No.: WO2023/023806
PCT Pub. Date: Mar. 2, 2023

(65) Prior Publication Data

US 2025/0176523 A1 Jun. 5, 2025

(30) Foreign Application Priority Data

Aug. 25, 2021 (AU) ................................ 2021221587

(51) Int. Cl.
*A01M 1/20* (2006.01)
*A01N 25/06* (2006.01)
*A01N 37/02* (2006.01)

(52) U.S. Cl.
CPC ........... *A01M 1/2077* (2013.01); *A01N 25/06* (2013.01); *A01N 37/02* (2013.01)

(58) Field of Classification Search
CPC .... A01M 13/00; A01M 13/006; A01M 17/00; A01M 17/002; A01M 17/008;
(Continued)

(56) References Cited

U.S. PATENT DOCUMENTS 3,238,667 A * 3/1966 Remmert ............. A01C 23/024 47/1.7
4,756,118 A * 7/1988 Evans, II ............ A01M 1/2094 43/132.1
(Continued)

FOREIGN PATENT DOCUMENTS

AU 2013205939 A1 1/2014
EP 1481587 A1 12/2004
(Continued)

OTHER PUBLICATIONS

International Search Report for Application No. PCT/AU2022/051034 dated Nov. 23, 2022 (3 pages).
(Continued)

*Primary Examiner* — Joshua J Michener
*Assistant Examiner* — Nicole Paige MacCrate
(74) *Attorney, Agent, or Firm* — Michael Best & Friedrich LLP

(57) ABSTRACT

A fumigant vaporising and delivery apparatus for vaporising one or more constituents of a fumigant, the apparatus including: a fluid supply; a pump connected to the fluid supply for drawing fluid at an ambient temperature therefrom; a heater operably connectable to a portable energy source, the heater connected to the pump for receiving and heating a flow of incoming fluid from the pump; a heat exchanger connected to and downstream from the heater adapted to receive an inflow of fluid at an elevated temperature from the heater, the heat exchanger having: a fluid pathway for fluid flow between the heater and the fluid
(Continued)

supply; and a fumigant pathway separate from the fluid pathway, extending between an inlet and an outlet in the heat exchanger for flow of a liquid fumigant therebetween; wherein the liquid fumigant vaporises as it flows within the fumigant pathway between the inlet and the outlet with exposure to heat from the fluid pathway, and spent fluid is received by the fluid supply for substantially continuous operation; wherein the fumigant exits the outlet of the heat exchanger in a vaporised state at a predetermined fumigant flow rate in a substantially sustained delivery stream for effective fumigant use.

20 Claims, 5 Drawing Sheets

(58) Field of Classification Search
CPC ..... A01M 1/2022; A01M 1/2094; A61L 2/20; A61L 2/22
USPC .................................................... 442/28, 292
See application file for complete search history.

(56) References Cited

U.S. PATENT DOCUMENTS 5,031,355 A * 7/1991 Ryan ..................... A01M 19/00 43/130
5,870,852 A * 2/1999 Stanley ................. A01M 19/00 43/132.1
6,047,496 A 4/2000 Leitner et al.
2011/0064607 A1* 3/2011 Hedman ................... A61L 2/06 422/1
2012/0180381 A1* 7/2012 DeMonte ............ A01M 1/2094 43/144
2015/0013562 A1 1/2015 Scully
2016/0073621 A1* 3/2016 Nielson ............... A01M 1/2094 43/132.1
2022/0117208 A1* 4/2022 Wright ................ A01M 17/002
2024/0390866 A1 11/2024 Trocha et al.

FOREIGN PATENT DOCUMENTS

JP H05199827 A 8/1993
JP 2005143433 A 6/2005
WO 2016197202 A1 12/2016
WO 2018232468 A1 12/2018

OTHER PUBLICATIONS

European Patent Office Search Report for Application No. 22859693.8 dated Jun. 18, 2025 (15 pages).

* cited by examiner

FUMIGANT VAPORIZING AND DELIVERY APPARATUS

FIELD OF THE INVENTION

The present invention relates to a fumigant vaporising and delivery apparatus which is effective for improved vaporizing and delivering a source of pressurized liquid fumigant constituents.

In particular, the present invention relates to a fumigant vaporising and delivery apparatus which improves efficiency of vaporisation of pressurized liquid fumigant constituents and flow rates for use in control of pests associated with stored foodstuffs and crops.

The invention has been developed primarily for use in improving efficacy of fumigant formulations and improving efficiency of use of fumigants for controlling pests in containers, vessels, silos including general fumigation of stored food sources, and will be described hereinafter with reference to this application. However, it will be appreciated that the invention is not limited to this particular field of use.

BACKGROUND OF THE INVENTION

Agricultural crops and foodstuffs such as fruit, vegetables and grains are susceptible to pests, rodents, and other pathogens. To minimize the effect of pests, rodents, and other pathogens on agriculture, biosecurity measures such as fumigation of structures including containers, vessels and storage facilities is undertaken.

It is also desirable to protect stored foodstuffs from pests and disease. Historically, fumigation has comprised the use of bactericidal, insecticidal, nematocidal or fungicidal chemicals, to structures including containers, vessels and storage facilities and stored foodstuffs, to disinfect or control pests and pathogens.

A wide range of chemical compounds have been used for fumigation purposes including hydrogen cyanide, calcium cyanide, sulphur dioxide, phosphine, methyl bromide, ethylene bromide, ethylene dichloride, 1,3-dichloropropene, ethyl formate, methyl isocyanate, sulfuryl fluoride, formaldehyde, carbon tetrachloride, dichlorobenzene, chloropicrin. Each of these compounds has advantages and disadvantages including hazards from toxicity and flammability.

Insect control in stored grain in Australia, in particular on-farm storages, relies heavily on phosphine and methyl bromide. The wide-scale, improper application of and excessive reliance on phosphine threatens development of insect resistance, and methyl bromide is found to be toxic to humans and other animals at high concentrations and contributes to ozone depletion.

Alternative fumigant treatments are being sought and ethyl formate has shown potential in this role, in particular for disinfestation of grain and fresh produce such as fruits and vegetables. Ethyl formate (EtF) as an active constituent in $CO_2$ is currently used as a fumigant of dried fruit in Australia and elsewhere. EtF is an ester formed when ethanol reacts with formic acid. EtF is considered safer and more environmentally friendly than methyl bromide. EtF however is highly flammable in its liquid state, having a boiling point of 54.3 degrees C. and a low flash point.

Accepted practice involves supply of cylinders containing a mixture of liquid agent and non-flammable gas under high pressure. However, liquid fumigant constituents need to be in a gaseous form for use as a fumigant to more efficiently diffuse throughout a fumigation space without damaging a stored food commodity.

Existing methods of applying liquid EtF as a fumigant require withdrawal of fumigant mixtures such as EtF/carbon dioxide liquid mixture, from a pressurized cylinder with a dip tube, and to evaporate the withdrawn liquid by means of an electric vaporizer unit.

A typical electric vaporizer unit works on the principle of a tube and shell heat exchanger having a series of coils submerged in an electronically heated oil bath. The liquid fumigant passes through the coils and by means of convection, the heated oil transfers heat to vaporize the liquid fumigant. Problems arise with such units due to the different specific heat capacities and different rates of expansion of liquid fumigant mixtures such as EtF and $CO_2$. This can lead to non-uniform distribution of EtF in $CO_2$, and condensation of EtF. The presence of liquid EtF poses flammability risks and contact with foodstuff at suboptimal concentrations can spoil the food without killing target pests travelling with the foodstuff. Clearly this is undesirable.

This effect is further exacerbated when short bursts of fumigant gas are delivered as the proportion of EtF in $CO_2$ can be difficult to sustain, resulting in gas streams having localized high concentrations of either component. The concentration of EtF in $CO_2$ may change depending on the extracted and/or remaining liquid in the cylinder. This could lead to a result where stored foodstuff is exposed to negative effects of higher concentrations of EtF as the cylinder of liquid fumigant empties. Even further, this can result in low fumigant flow rates or fluctuating flow rates thereby requiring long treatment times with greater expense.

Current vaporizer units suffer from drawbacks including:

Use of oil requires frequent replacement and disposal of waste oil with concomitant environmental issues;

Fluctuation in temperature;

Difficulty in controlling vaporization;

Precipitation of liquid fumigant;

Localized high concentrations of liquid fumigant component contacting foodstuffs;

Require use of specialised electric heating elements with insufficient heat energy and associated high costs;

Large volume of oil is required;

Long lead time for achieving effective temperature for vaporization of liquid fumigant;

Low flow rates of fumigant gases hence time consuming and expensive.

The present invention seeks to provide a practical means to enable improved practical use of a liquid fumigant mixture, which will overcome or substantially ameliorate at least one or more of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

The present invention in a first aspect is directed to a fumigant vaporising and delivery apparatus for vaporising one or more constituents of a fumigant, the apparatus including: a fluid supply; a pump connected to the fluid supply for drawing fluid at an ambient temperature therefrom; a heater operably connectable to a portable energy source, the heater connected to the pump for receiving and heating a flow of incoming fluid from the pump; a heat exchanger connected to and downstream from the heater adapted to receive an inflow of fluid at an elevated temperature from the heater, the heat exchanger having: a fluid pathway for fluid flow between the heater and the fluid supply; and a fumigant pathway separate from the fluid pathway, extending between an inlet and an outlet in the heat exchanger for flow of a liquid fumigant therebetween; wherein the liquid fumigant vaporises as it flows within the fumigant pathway between the inlet and the outlet with exposure to heat from the fluid pathway, and spent fluid is received by the fluid supply for substantially continuous operation; wherein the fumigant exits the outlet of the heat exchanger in a vaporised state at a predetermined fumigant flow rate in a substantially sustained delivery stream for effective fumigant use.

The present invention provides a supplementary heat source which enables consistent flow of gaseous fumigant mixture from a liquid pressurized source at a consistent operating temperature and high flow rates with minimal precipitation and separation of components. This leads to shorter fumigation times and less exposure of stored food-stuff to localized high concentration of fumigant active agent.

Preferably, the fluid supply is a reservoir of water. The present apparatus advantageously provides recirculation of water supply which is environmentally more friendly than and overcomes issues associated with use of oil baths. Whereas prior art devices require a large volume of oil, the present invention only requires a relatively small volume of water.

Preferably, the heater is connected to a source of LPG.

As the present vaporizer uses water as a medium for transferring heat as opposed to oil, apart from being more readily available than oil, the small volume of water required can be heated quickly to an operating temperature using a gas-powered water heater rather than a specialized electric heating element of the prior art, which takes at least 30 minutes to heat the oil bath to an effective temperature. Use of electrical elements as a heat source and oil as a heating fluid of the prior art represents a dual loss of efficiency which is regained in the present apparatus.

Without being bound by theory, applicant has established the use of LPG as a supplemental source of heat energy improves capability to achieve higher flow rates of fumigant gases in a significantly shorter time and obtaining consistent vaporized proportions of fumigant and diluent components in the gaseous phase. This reduces fumigation times making fumigation much more efficient and cost effective.

The heat exchanger is preferably a plate heat exchanger.

Preferably, the apparatus is configured to deliver the one or more vaporised fumigant constituents at or above a pre-determined vaporised fumigant outflow rate.

Preferably, the pre-determined vaporised fumigant outflow rate is above 1 kg/min.

Preferably, the pre-determined vaporised fumigant outflow rate is in a range between 1 kg/min and 10 kg/min. More preferably, the pre-determined vaporised fumigant outflow rate is in a range between 4 kg/min and 8 kg/min. Most preferably, the pre-determined vaporised fumigant outflow rate is about 6 kg/min.

Preferably, the heat exchanger is configured to heat the one or more fumigant constituents in the plate heat exchanger to a temperature at or above a pre-determined fumigant vaporisation temperature.

Preferably, the pre-determined fumigant vaporisation temperature is about 55 degrees Celsius at ambient pressure.

Preferably, the water heater is configured to heat the water therein to a temperature in a range between 60 degrees Celsius and 99 degrees Celsius.

More preferably, the water heater is configured to heat the water therein to a temperature in the range of about 80 degrees Celsius to 99 degrees Celsius, alternatively about 90 degrees Celsius to 99 degrees Celsius, further alternatively about 95 degrees Celsius.

Preferably, the one or more fumigant constituents comprises Ethyl Formate.

Preferably, the fumigant includes Ethyl Formate and Carbon Dioxide.

Preferably, the fumigant comprises a mixture of ETF 16.7% v/v and $CO_2$ 83.3% v/v.

Preferably, the fumigant inlet is configured to receive the fumigant at or above a pre-determined fumigant inflow rate. Preferably the pre-determined fumigant inflow rate is equal to the outflow rate.

Preferably, the water heater comprises a gas-powered water heater. Preferably, the gas-powered water heater is a tankless (on demand type-continuous flow) water heater.

Preferably, the apparatus is configured to provide the heated water to the heat exchanger at a temperature in the range of about 80 degrees Celsius to 98 degrees Celsius.

Preferably, the apparatus is configured to provide the heated water to the heat exchanger at a temperature in the range of about 90 degrees Celsius to 95 degrees Celsius.

Preferably, the apparatus is configured to provide the heated water to the heat exchanger at a temperature of about 95 degrees Celsius.

Preferably, the apparatus is configured to circulate the water around the apparatus.

Preferably, the apparatus is configured to circulate the water around the plate heat exchanger and the water heater.

Preferably, the apparatus is configured to circulate the water into the water heater at a temperature in the range of about 55 degrees Celsius to 85 degrees Celsius.

Preferably, the apparatus is configured to circulate the water into the water heater at a temperature in the range of about 60 degrees Celsius to 85 degrees Celsius.

Preferably, the apparatus is configured to circulate the water into the water heater at a temperature in the range of about 70 degrees Celsius to 80 degrees Celsius.

Preferably, the apparatus is configured to circulate the water into the water heater at a temperature of about 75 degrees Celsius.

Preferably, the apparatus is configured to maintain the water circulating around the plate heat exchanger and water heater at or above a pre-determined water circulation temperature.

Preferably, the predetermined water circulation temperature is in the range of about 65 to 85 degrees.

Preferably, the predetermined water circulation temperature is in the range of about 70 to 80 degrees.

Preferably, the predetermined water circulation temperature is about 75 degrees.

Preferably, the apparatus is configured to maintain the water circulating around the plate heat exchanger and water heater at or above a pre-determined water circulation flow rate.

Preferably, the pre-determined water circulation flow rate is in the range of about 20 L/min to 60 L/min.

Preferably, the pre-determined water circulation flow rate is in the range of about 30 L/min to 50 L/min wherein the pre-determined water circulation flow rate is in the range of about 35 L/min to 45 L/min.

Preferably, the pre-determined water circulation flow rate is about 40 L/min.

Preferably, the apparatus is configured to circulate the water around the plate heat exchanger and water heater using a water circulation device.

Preferably, the water circulation device is located on the apparatus.

Preferably, the water heater is connected to a water reservoir via a water heater inlet.

Preferably, the water reservoir is located on the apparatus.

Preferably, the apparatus is configured to circulate the water around the plate heat exchanger, water heater and water vessel using the water circulation device.

Preferably, the water circulation device comprises a pump configured to draw water from the water vessel and pump it into the water heater.

Preferably, the pump is configured to pump the water at a flow rate of approximately 40 L/min.

Preferably, the apparatus includes one or more controllers for controlling one or more of the following:

a. The temperature range in which water is heated by the water heater;
b. The temperature range in which the apparatus is able to provide heated water to the plate heat exchange;
c. the pre-determined vaporised fumigant outflow rate;
d. the pre-determined fumigant inflow rate;
e. the pre-determined water circulation temperature;
f. the pre-determined water circulation flow rate;

Preferably, the apparatus includes a frame, and the water heater, water heater inlet, plate heat exchanger, fumigant inlet and fumigant outlet are located on the frame.

Preferably, one or more of the following components are located on the frame:

a. the water vessel;
b. the water circulation device;
c. piping for connecting the water vessel to the water circulation device;
d. piping for connecting the water circulation device to the water heater and/or water heater inlet;
e. piping for connecting the water heater to the plate heat exchanger;
f. piping for connecting the plate heat exchanger to the water vessel;

Preferably, the system includes a digital scale for measuring fumigant inflow from a pressurized cylinder, wherein dosing is tracked by measuring the decrease in weight of the cylinder by the digital scales.

In a related aspect of the present invention there is disclosed a self-contained transportable gas supplemented fumigant vaporizing and delivery system comprising: a mobile frame on which there is located: a water supply; a water pump connected to the water supply for drawing water at an ambient temperature therefrom; a gas heater operably connectable to a portable gas source, the heater located above and connected to the pump for receiving and heating a flow of incoming water from the pump; a heat exchanger connected to and laterally spaced downstream from the heater and located above and interconnected to the water supply, the heat exchanger adapted to receive an inflow of water at an elevated temperature from the heater, the heat exchanger having: a waterflow pathway for displacement of water between the heater and the water supply; and a fumigant pathway separate from the waterflow pathway, extending between an inlet in the heat exchanger connectable to a supply of liquid fumigant and an outlet in the heat exchanger for flow of a liquid fumigant therebetween; wherein the liquid fumigant vaporises as it flows within the fumigant pathway between the inlet and the outlet with exposure to heat from the waterflow pathway, and spent water from the heat exchanger is received by the water supply for substantially continuous operation; wherein the fumigant exits the outlet of the heat exchanger in a vaporised state at a predetermined fumigant flow rate in a substantially sustained delivery stream for effective fumigant use.

In a further embodiment of the present invention there is disclosed a portable fumigant vaporising and delivery apparatus which includes: a first pathway for passage of liquid EtF/$CO_2$ fumigant mix between an inlet connectable to a cylinder supply source and a fumigant gas delivery exit; a second pathway adapted to receive and circulate water from a water reservoir, the water reservoir being connectable to a domestic water supply, the second pathway having at least a portion cooperating with the first pathway to transfer heat to an inflow of the EtF/$CO_2$ fumigant mix in the first pathway; a heat source in the second pathway upstream from the cooperating portion thereof and spaced apart from the liquid EtF/$CO_2$ fumigant mix inlet and/or supply source, the heat source being gas powered for heating water passing therethrough to at least a predetermined temperature to vaporize the EtF/$CO_2$ fumigant mix in a reduced time; wherein inflow of EtF/$CO_2$ fumigant mix in the first pathway is heated by the cooperating portion of the second pathway effective to vaporize the fumigant mix for uniform distribution of EtF in the fumigant mix and substantially reducing time taken for a product treatment, and wherein water is returned to the reservoir for repeat use.

The second pathway is a circuit, so that spent water is returned to the reservoir after heat exchange with liquid fumigant mix in the first pathway, for repeat use. The apparatus can include a water pump connectable to a domestic power supply which is adapted to draw water from the reservoir for transport throughout the second pathway.

The apparatus can further include a delivery system at or close to the gas delivery exit for transferring the vaporized EtF/$CO_2$ mix to a treatment site at a predetermined rate.

The apparatus can further include a series of temperature and pressure sensors operably connected to the apparatus to detecting temperature and pressure at the inlet and gas delivery outlet.

Benefits of the invention include:

- The vaporizing apparatus of the present invention provides a consistent and relatively high flow rate of fumigant constituents in a gaseous phase with substantially minimal precipitation of the fumigant constituents;
- Ability to use an alternative heat source such as LPG, contrary to prior art devices due to high flammability of liquid EtF, creates a larger available source of heat energy (roughly 59.0 KW) compared with the prior art electric vaporizer units which uses 2×240V 10 A plugs that combine to provide an available heat energy of 4.8 kW. In addition, as oil is heated it undergoes physical changes such as viscosity which further introduces an energy loss factor;
- concentration of fumigant constituents in gaseous state more constant hence minimizing the adverse effects of exposure of foodstuffs to varying and indeed higher than desirable concentration of fumigant;
- Higher capacity for vaporization of fumigant constituents
- Ease of maintenance of equipment since water used as heat transfer medium and more readily available heat transfer medium;
- No need for specialized electric heating element; Low volume of water used;
- Water easier to heat with instantaneous energy source;
- No need to dispose of waste oil;
- Light weigh hence easily portable.

Other aspects of the invention are also disclosed with reference to accompanying examples.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DESCRIPTION OF PREFERRED EMBODIMENTS

Figure 1:
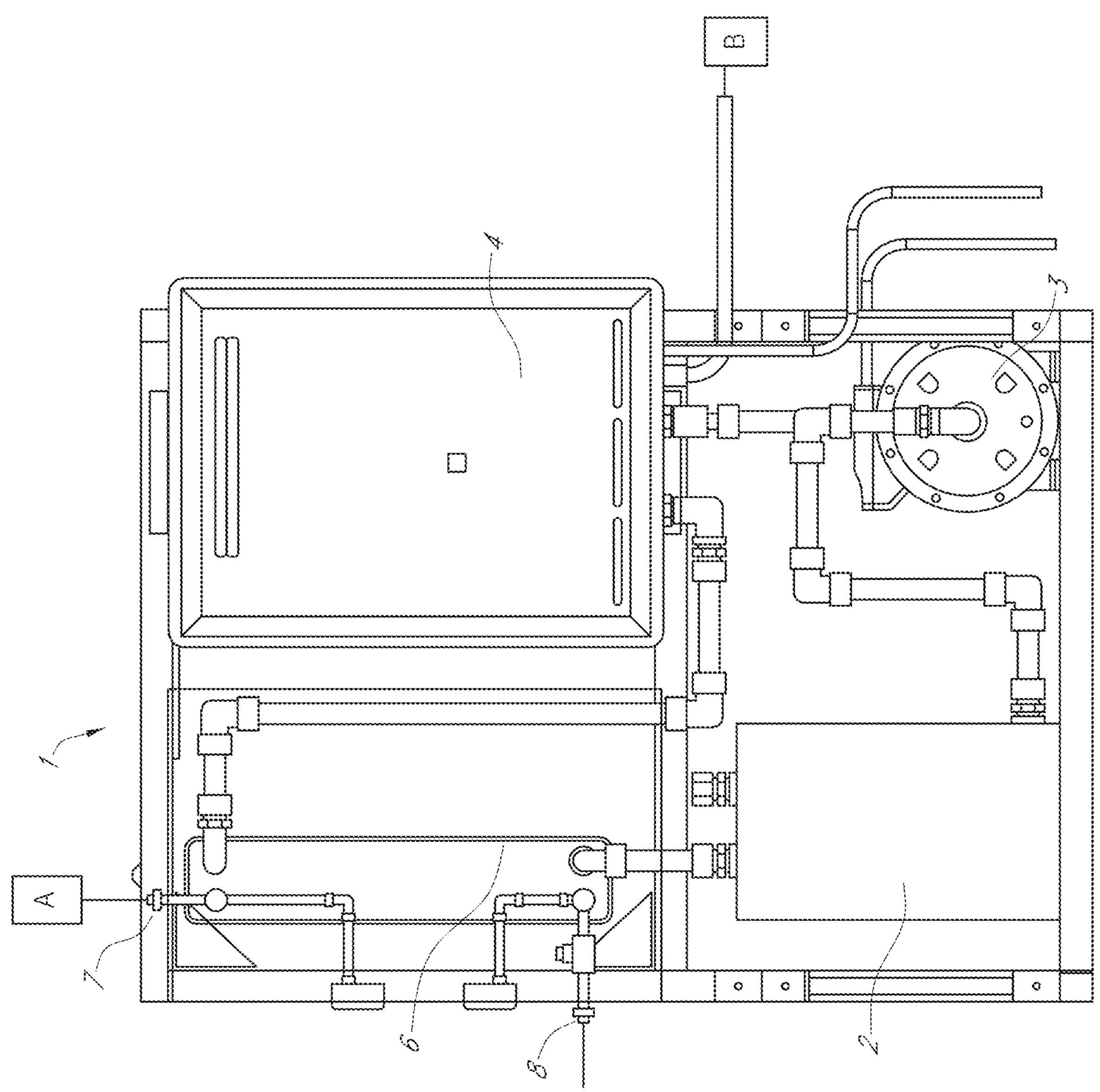
FIG. 1 is a schematic representation of the apparatus from a front end view of a in accordance with a preferred embodiment of the present invention.

It should be noted in the following description that like or the same reference numerals in different embodiments denote the same or similar features.

Referring to the drawings there is shown a fumigant vaporising and delivery apparatus 1 for vaporising one or more constituents of a liquid fumigant source A, comprising: a water vessel 2 providing a supply of water; a water pump 3 connected to the water vessel 2, the pump adapted to draw water from the water vessel at an ambient temperature; a water heater 4 operably connected to a source of LPG B, the heater 4 connected to the water pump 3 for receiving and heating a flow of incoming water therefrom; and a heat exchanger 6 connected to and downstream from the water heater adapted to receive an inflow of water from the heater at an elevated temperature.

The heat exchanger 6 includes a pathway for water flow between the heater 4 and the water vessel 2; and a fumigant pathway separate from the water pathway extending between an inlet 7 and an outlet 8 in the heat exchanger for ingress and flow of a liquid fumigant therebetween. The heat exchanger is a plate heat exchanger having an enclosure 9.

As the liquid fumigant flows through the fumigant pathway between the inlet 7 and the outlet 8, heat is transferred from the water in the waterflow pathway vaporizing the fumigant. Spent water is returned to the water vessel 2 for substantially continuous operation and recirculation. The fumigant exits the outlet 8 of the heat exchanger 6 in a vaporised state at a predetermined fumigant flow rate in a substantially sustained delivery stream for effective fumigant use.

Figure 2:
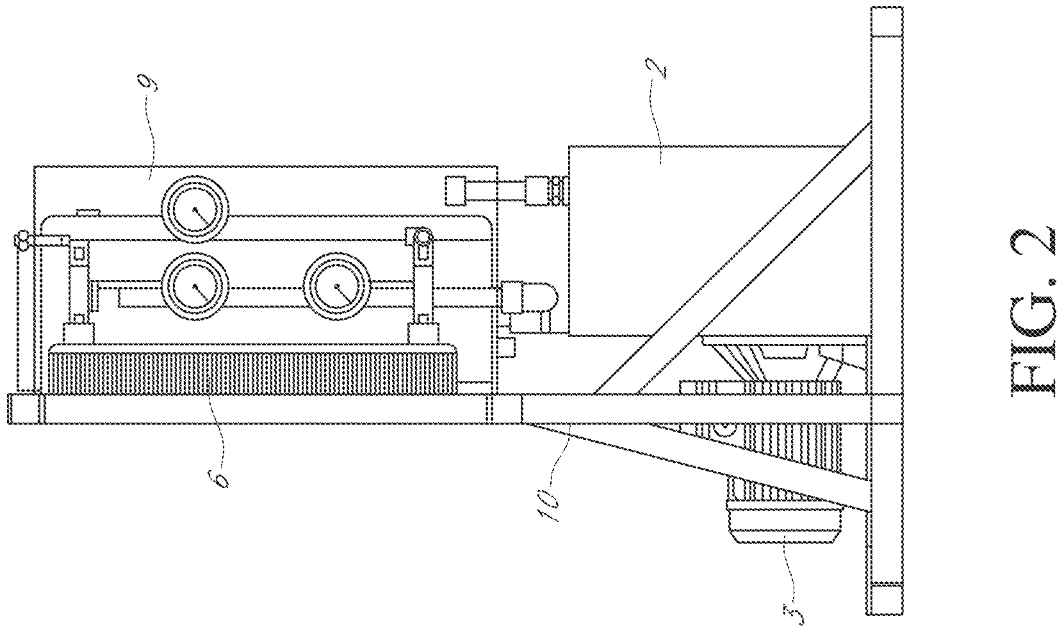
FIG. 2 is a schematic representation from one side of the apparatus in FIG. 1 in accordance with a preferred embodiment of the present invention.
Figure 3:
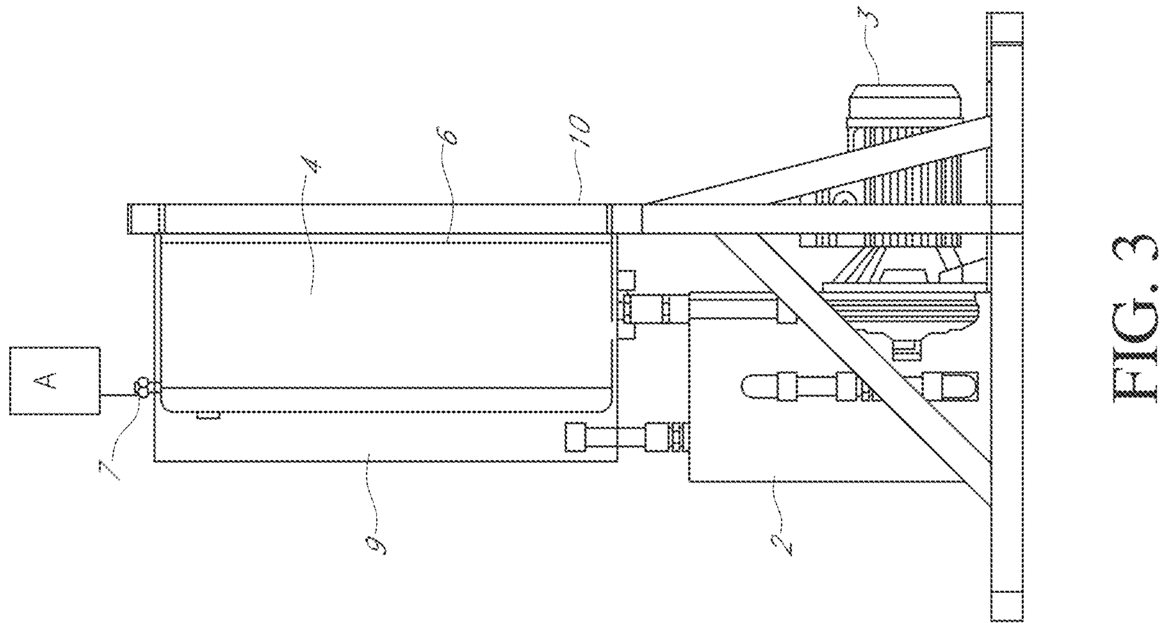
FIG. 3 is a schematic representation from opposite side of the apparatus in FIG. 2 in accordance with a preferred embodiment of the present invention.

As further shown in FIGS. 2 and 3, the apparatus includes a frame 10 on which there is located thereon: a. the water vessel; b. the water circulation device; c. piping for connecting the water vessel to the water circulation device; d. piping for connecting the water circulation device to the water heater and/or water heater inlet; e. piping for connecting the water heater to the plate heat exchanger; and f. piping for connecting the plate heat exchanger to the water vessel.

Example 1

Figure 4:
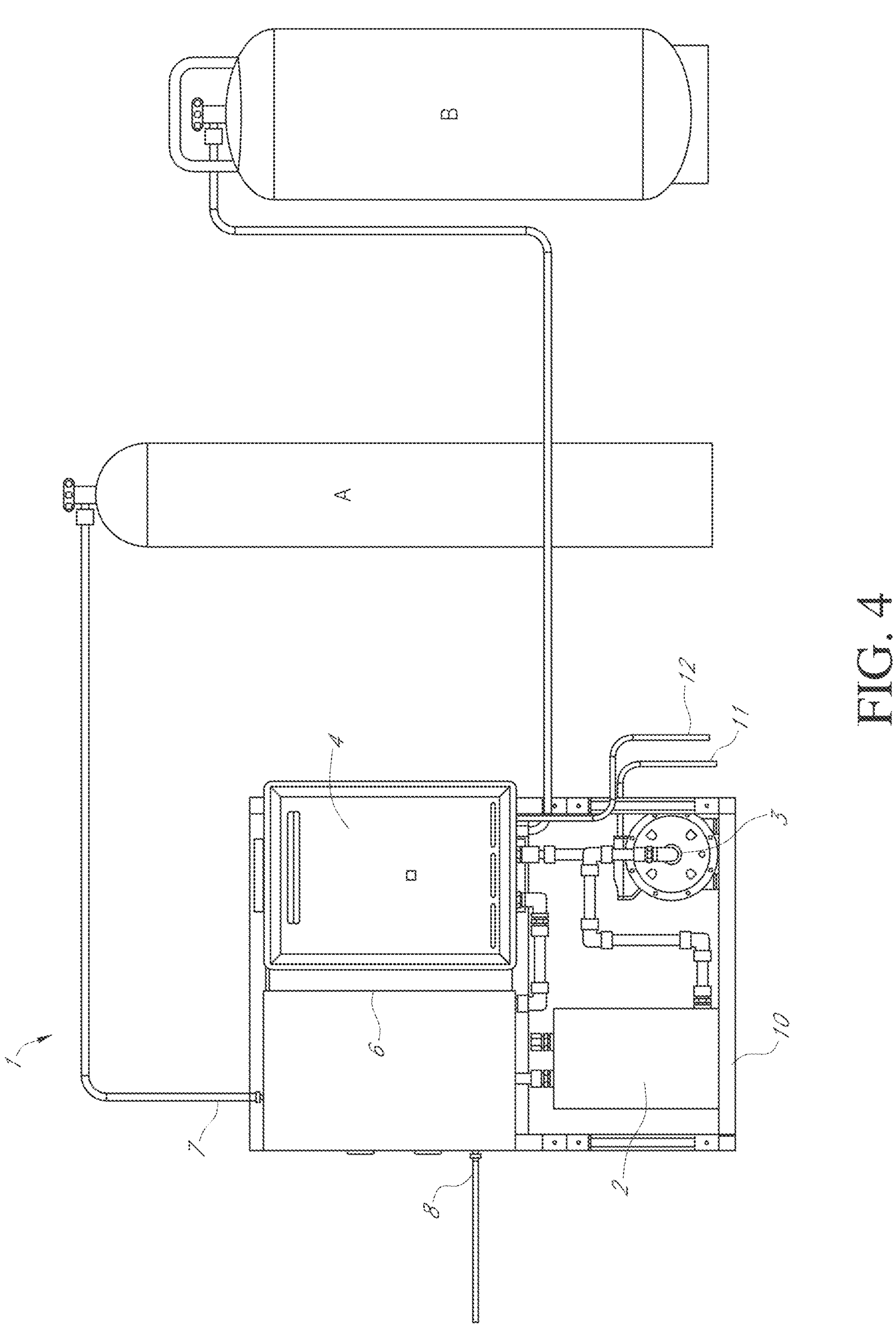
FIG. 4 is a schematic representation of the apparatus in accordance with a preferred embodiment of the present invention.

Referring to FIG. 4 there is shown a self-contained transportable gas supplemented fumigant vaporizing and delivery system 1 comprising: a mobile frame 10 on which there is located: a water supply 2; a water pump 3 operated by 240V 10 A domestic mains supply 11 interconnected to the water supply for drawing water at a temperature of about 75 degrees C. at a rate of 40 L/min therefrom; a gas heater 4 powered by 240V 10 A domestic mains supply 12 operably connectable to a portable gas source B supplied to the heater at a rate of 250 MJ/h at 2.75 kPa, the heater located above and connected to the pump for receiving and heating a flow of incoming water from the pump; a heat exchanger 6 connected to and laterally spaced downstream from the heater 4 and located above and interconnected to the water supply 2, the heat exchanger adapted to receive an inflow of water from the heater exiting the heater and into heat exchanger at 40 L/min at a temperature of 95 degrees C., the heat exchanger having: a waterflow pathway for displacement of water between the heater 4 and the water supply 2; and a fumigant pathway separate from the waterflow pathway, extending between a fumigant inlet 7 supplied with liquid fumigant by pressurized cylinder A at 50 bar at the fumigant inlet 7 and outlet 8 in the heat exchanger for flow of a fumigant therebetween; wherein incoming liquid fumigant vaporises as it flows within the fumigant pathway between the inlet 7 and the outlet 8 with exposure to heat from the waterflow pathway, and spent water exiting the heat exchanger to the water supply 2 at 40 L/min at a temperature of 75 degrees C. provides for substantially continuous operation; wherein vaporized fumigant exits the outlet at 6 Kg/min.

Example 2

Figure 5:
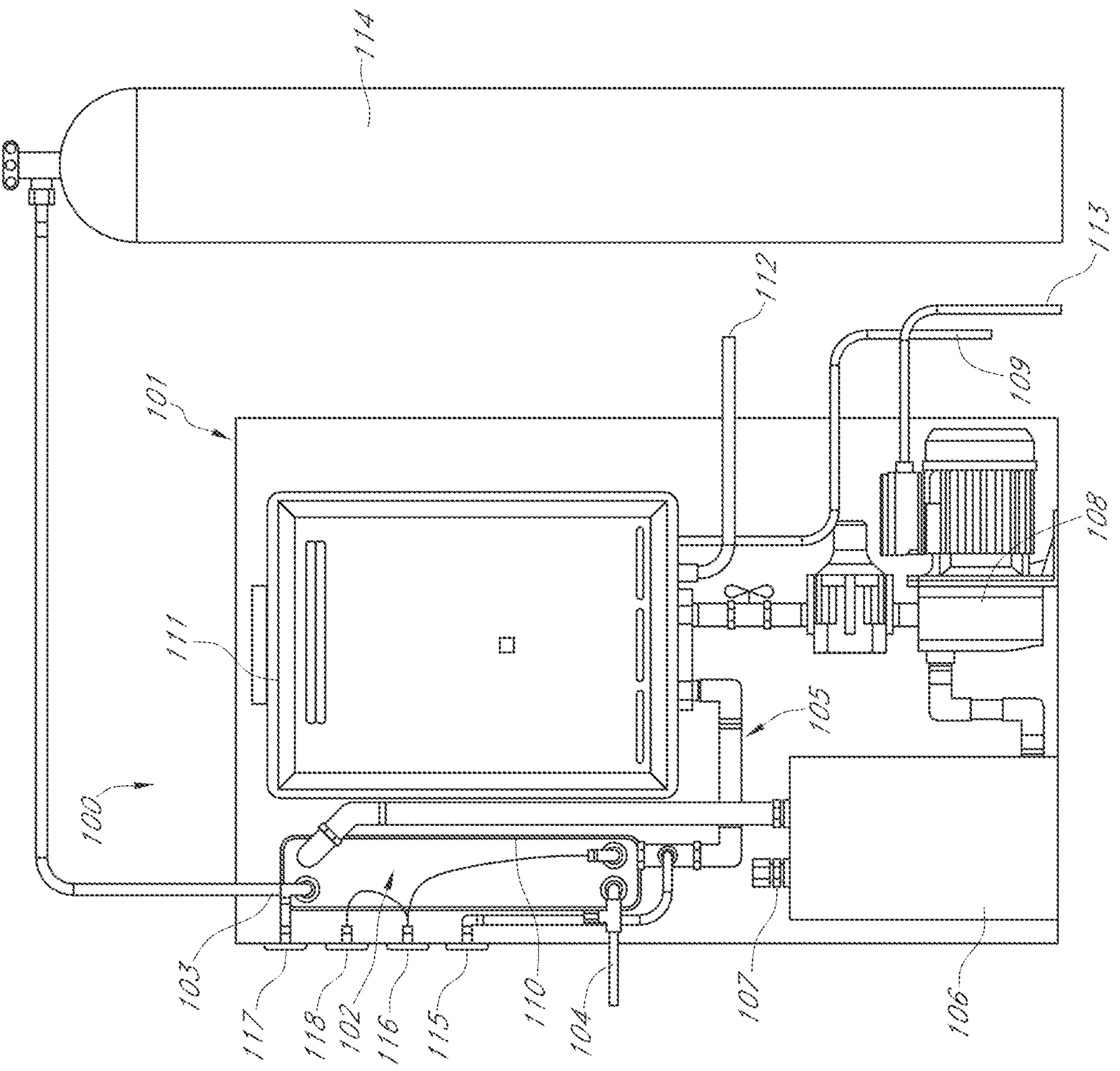
FIG. 5 is a schematic representation of the apparatus in accordance with a further preferred embodiment of the present invention.

Referring to FIG. 5 there is disclosed a portable fumigant vaporising and delivery apparatus 100. The apparatus includes a housing or frame 101 on or in which there is defined a first pathway 102 extending between an inlet 103 and a fumigant gas delivery exit 104. The inlet 103 is shown connected to a source of liquid EtF/$CO_2$ fumigant mix 114.

The apparatus includes a second pathway 105 defining a circuit starting and ending at a water reservoir 106. The water reservoir is connectable to a domestic water supply by attachment 107. In an operating condition, the second pathway is adapted to circulate water from the water reservoir. In this embodiment, the water reservoir is connected to a water pump 108 which is operable by domestic electricity supply 109. The water pump controls flow of water throughout the second pathway preferably at a rate of about 40 L/min.

The apparatus further includes a gas-powered water heater 111 of the on demand continuous flow type) within the second pathway, which is connectable to an LPG supply, via conduit 112, and domestic electricity 113. The heat source is shown in spaced apart relation to the inlet 103 and the supply cylinder 114.

At least a part of the second pathway 105 cooperates with a plate heat exchanger 110 within the first pathway 102.

In an operating condition, water from the water reservoir is drawn by the water pump into and continuously circulating within the second pathway 105. In a first portion of the second pathway, water at ambient temperature is circulated through the heat source 111 where the water temperature is controllably increased to a temperature of about 75 degrees C. The heated water enters chamber 110 and heat is transferred from the water to the fumigant EtF/$CO_2$ mix in an overlapping portion of the first and second pathways by intermediate plate heat exchange members. The rate at which water is heated by the LPG heat source is very fast whereby within substantially seconds of exposure to the heat source water is heated to an effective predetermined vaporization temperature for the fumigant mix. This means that an operator can effectively treat a treatment site expeditiously compared to prior art devices without the shortfall of having to take significant time to heat oil to temperature and properly dispose of the oil.

The fumigant mix vaporizes in the heat exchange chamber and exits the apparatus to the delivery treatment site downstream. The vaporised fumigant outflow rate is controlled within the range between 4 kg/min and 8 kg/min. Cold water exits the heat exchange chamber back to the water reservoir completing one circuit of the second pathway. The circuit is repeated.

The apparatus further includes a series of sensors for detecting pressure 115 and temperature 116 of the water entering the heat exchange chamber and pressure 117 and temperature 118 of the fumigant mix at the inlet and exit respectively.

The use of water and LPG as a heat source represents a departure from prior art devices. This combination and structural arrangement of elements in the apparatus enables improved vaporization consistency and uniform distribution of EtF in the fumigant mix as well as substantially reducing time taken for a product treatment, and returning and recirculating water is returned to the reservoir for repeat use as opposed to the deficiencies of oil and use of electric elements as a heat source.

Benefits

The vaporizing apparatus of the present invention provides a consistent flow of fumigant constituents in a gaseous phase with substantially minimal precipitation of the fumigant constituents;

- concentration of fumigant constituents in gaseous state more constant hence minimizing the adverse effects of exposure of foodstuffs to varying and indeed higher than desirable concentration of fumigant;
- Higher capacity for vaporization of fumigant constituents;
- Higher flow rates hence reduced fumigation times;

The system provides a non-typical source of energy to provide heat for the vaporisation of the fumigant. This in combination with heat transfer efficient design and components in a geometrically compact format means the present vaporiser can provide higher vaporised fumigant flow rates and therefore decrease the application time necessary for fumigation.

high efficiency gas powered system to change the liquid mixture of Ethyl formate and Carbon dioxide into a gas that can disperse through a fumigation space more evenly.

This application method also prevents conditions where condensate Ethyl formate residue can build up on the commodities, thereby preventing the presence localised brown spots.

Ease of maintenance of equipment since water used as heat transfer medium and more readily available heat transfer medium;

No need for specialized electric heating element.

Interpretation

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to an apparatus for generating a gaseous fumigant from high pressure liquid sources of fumigant constituents.

The invention claimed is:

1. A fumigant vaporizing and delivery apparatus for vaporizing one or more constituents of a fumigant, the apparatus including:

a pump connectable to a fluid supply for drawing a fluid at an ambient temperature therefrom;

a heater operably connectable to a portable energy source, the heater connected to the pump for receiving and heating a flow of incoming fluid from the pump;

a heat exchanger connected to and downstream from the heater adapted to receive an inflow of fluid at an elevated temperature from the heater, the heat exchanger having:

a fluid pathway for fluid flow between the heater and the fluid supply; and a fumigant pathway separate from the fluid pathway, extending between a fumigant inlet and a fumigant outlet in the heat exchanger for flow of a liquid fumigant therebetween;

wherein the liquid fumigant vaporizes as it flows within the fumigant pathway between the fumigant inlet and the fumigant outlet with exposure to heat from the fluid pathway, and spent fluid is received by the fluid supply to enable continuous operation;

wherein the fumigant exits the fumigant outlet of the heat exchanger in a vaporized state at a predetermined fumigant flow rate in a fumigant delivery stream.

2. A fumigant vaporizing and delivery apparatus according to claim 1, wherein the heat exchanger is a plate heat exchanger.

3. A fumigant vaporizing and delivery apparatus according to claim 2, wherein the apparatus is configured to maintain the fluid circulating around the plate heat exchanger and heater at or above a pre-determined water circulation temperature.

4. A fumigant vaporizing and delivery apparatus according to claim 3, wherein the apparatus is configured to maintain the fluid circulating around the plate heat exchanger at a pre-determined fluid circulation temperature in the range of 65 to 85 degrees.

5. A fumigant vaporizing and delivery apparatus according to claim 2 further including a frame, wherein the heater, a heater inlet, the plate heat exchanger, the fumigant inlet and the fumigant outlet are located on the frame.

6. A fumigant vaporizing and delivery apparatus according to claim 5, wherein one or more of the following components are located on the frame:

a. the fluid supply;

b. the pump;

c. piping for connecting the fluid supply to the pump;

d. piping for connecting the pump to the heater and/or heater inlet;

e. piping for connecting the heater to the plate heat exchanger;

f. piping for connecting the plate heat exchanger to the fluid supply.

7. A fumigant vaporizing and delivery apparatus according to claim 2, wherein the apparatus is configured to maintain the fluid circulating around the plate heat exchanger and heater at or above a pre-determined water circulation flow rate in the range of 20 L/min to 60 L/min.

8. A fumigant vaporizing and delivery apparatus according to claim 2, wherein the apparatus includes one or more controllers for controlling one or more of the following:

a. the temperature range in which the fluid is heated by the heater;

b. the temperature range in which the apparatus is able to provide heated fluid to the plate heat exchanger;

c. the pre-determined vaporized fumigant outflow rate;

d. the pre-determined fumigant inflow rate;

e. the pre-determined water circulation temperature;

f. the pre-determined water circulation flow rate.

9. A fumigant vaporizing and delivery apparatus according to claim 1, wherein the apparatus is configured to deliver the one or more vaporized fumigant constituents at or above a pre-determined vaporized fumigant outflow rate.

10. A fumigant vaporizing and delivery apparatus according to claim 9, wherein the pre-determined vaporized fumigant outflow rate is in a range between 1 kg/min and 10 kg/min.

11. A fumigant vaporizing and delivery apparatus according to claim 1, wherein the one or more fumigant constituents comprises ethyl formate.

12. A fumigant vaporizing and delivery apparatus according to claim 11, wherein the one or more fumigant constituents further includes $CO_2$.

13. A fumigant vaporizing and delivery apparatus according to claim 1, wherein the fluid supply is a reservoir of water and wherein the apparatus recirculates the fluid supply so the vaporization of fumigant is substantially continuous.

14. A fumigant vaporizing and delivery apparatus according to claim 1, wherein the heater is connected to a source of LPG.

15. A fumigant vaporizing and delivery apparatus according to claim 1, wherein the heater is configured to heat the fluid therein to a temperature in a range between 60 degrees Celsius and 99 degrees Celsius.

16. A fumigant vaporizing and delivery apparatus according to claim 1, wherein the fumigant inlet is configured to receive the fumigant at or above a pre-determined fumigant inflow rate.

17. A fumigant vaporizing and delivery apparatus according to claim 1, wherein the heater comprises a gas-powered water heater.

18. A fumigant vaporizing and delivery apparatus according to claim 1, wherein the apparatus is configured to circulate the fluid into the heater at a temperature in the range of 55 degrees Celsius to 85 degrees Celsius.

19. A fumigant vaporizing and delivery apparatus according to claim 1, wherein the system includes a digital scale for measuring fumigant inflow from a pressurized cylinder, wherein dosing is tracked by measuring the decrease in weight of the cylinder by the digital scales.

20. A fumigant vaporizing and delivery apparatus according to claim 1, wherein the one or more fumigant constituents comprises ethyl formate and $CO_2$, and the vaporization of the fumigant is effective for uniform distribution of ethyl formate in the fumigant.

* * * * *